(12) United States Patent
Wakabayashi et al.

(10) Patent No.: US 11,762,271 B2
(45) Date of Patent: Sep. 19, 2023

(54) PROJECTOR

(71) Applicant: SEIKO EPSON CORPORATION, Tokyo (JP)

(72) Inventors: Junichi Wakabayashi, Ueda (JP); Junichi Suzuki, Matsumoto (JP); Ryuta Koizumi, Shiojiri (JP); Masaya Masuda, Matsumoto (JP); Hidenori Kawata, Chino (JP); Yoshitomo Kumai, Okaya (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/706,673

(22) Filed: Mar. 29, 2022

(65) Prior Publication Data
US 2022/0308437 A1    Sep. 29, 2022

(30) Foreign Application Priority Data
Mar. 29, 2021   (JP) ................. 2021-055018

(51) Int. Cl.
*G03B 21/20* (2006.01)
(52) U.S. Cl.
CPC ....... *G03B 21/2073* (2013.01); *G03B 21/204* (2013.01); *G03B 21/2066* (2013.01)
(58) Field of Classification Search
CPC .............. G03B 21/2073; G03B 21/204; G03B 21/2066

USPC ........................................................... 353/34
See application file for complete search history.

(56) References Cited

U.S. PATENT DOCUMENTS

| | | | |
|---|---|---|---|
| 10,051,851 B2 | 8/2018 | Hariyama et al. | |
| 10,251,384 B2 | 4/2019 | Barroso et al. | |
| 2011/0242490 A1* | 10/2011 | Itoh ....................... | H04N 13/363 353/8 |
| 2014/0063358 A1* | 3/2014 | Kegasawa ............ | H04N 9/3167 349/9 |
| 2014/0223803 A1 | 8/2014 | Hariyama et al. | |
| 2017/0006848 A1 | 1/2017 | Barroso et al. | |

FOREIGN PATENT DOCUMENTS

| | | |
|---|---|---|
| JP | 2005-266190 A | 9/2005 |
| JP | 5926842 B | 5/2016 |
| JP | 2017-509321 A | 4/2017 |

* cited by examiner

*Primary Examiner* — Jerry L Brooks
(74) *Attorney, Agent, or Firm* — Dority & Manning, P.A.

(57) ABSTRACT

A projector includes an image light generator configured to modulate light emitted from a light source to generate image light, a projection optical device configured to project the image light, a polarization switching element disposed at a light exit side of the image light generator and configured to switch a polarization state of the image light emitted from the image light generator, and a controller configured to control the polarization switching element. The controller controls the polarization switching element to switch the polarization state of the image light with a predetermined period.

9 Claims, 7 Drawing Sheets

PROJECTOR

The present application is based on, and claims priority from JP Application Serial Number 2021-055018, filed Mar. 29, 2021, the disclosure of which is hereby incorporated by reference herein in its entirety.

BACKGROUND

1. Technical Field

The present disclosure relates to a projector.

2. Related Art

In recent years, the projectors increases in outdoor application such as projection mapping or signage. In, for example, JP-A-2005-266190 (Document 1), there is disclosed a projector intended to be used outdoors.

When performing image projection outdoors by the projector of Document 1, insects having phototaxis fly to, and thus, converge on the projector equipment and the projection image. Then, there are a possibility that a failure risk increase due to the insects invading inside the projector from an intake duct and so on, a possibility that the display quality degrades due to the insects adhering to a lens, and a possibility that an uncomfortable feeling is provided to the viewing audience due to the insects converging on the projection image.

SUMMARY

According to an aspect of the present disclosure, there is provided a projector including an image light generator configured to modulate light emitted from a light source to generate image light, a projection optical device configured to project the image light, a polarization switching element disposed at a light exit side or the image light generator and configured to switch a polarization state of the image light emitted from the image light generator, and a controller configured to control the polarization switching element. The controller controls the polarization switching element to switch the polarization state of the image light with a predetermined period.

DESCRIPTION OF EXEMPLARY EMBODIMENTS

Hereinafter, some embodiments the present disclosure will be described with reference to the drawings. It should be noted that in each of the drawings described below, scale sizes and angles of the members are made different from the actual ones in order to describe the members with recognizable dimensions.

First Embodiment

An example of a projector according to the present embodiment will be described.

Figure 1:
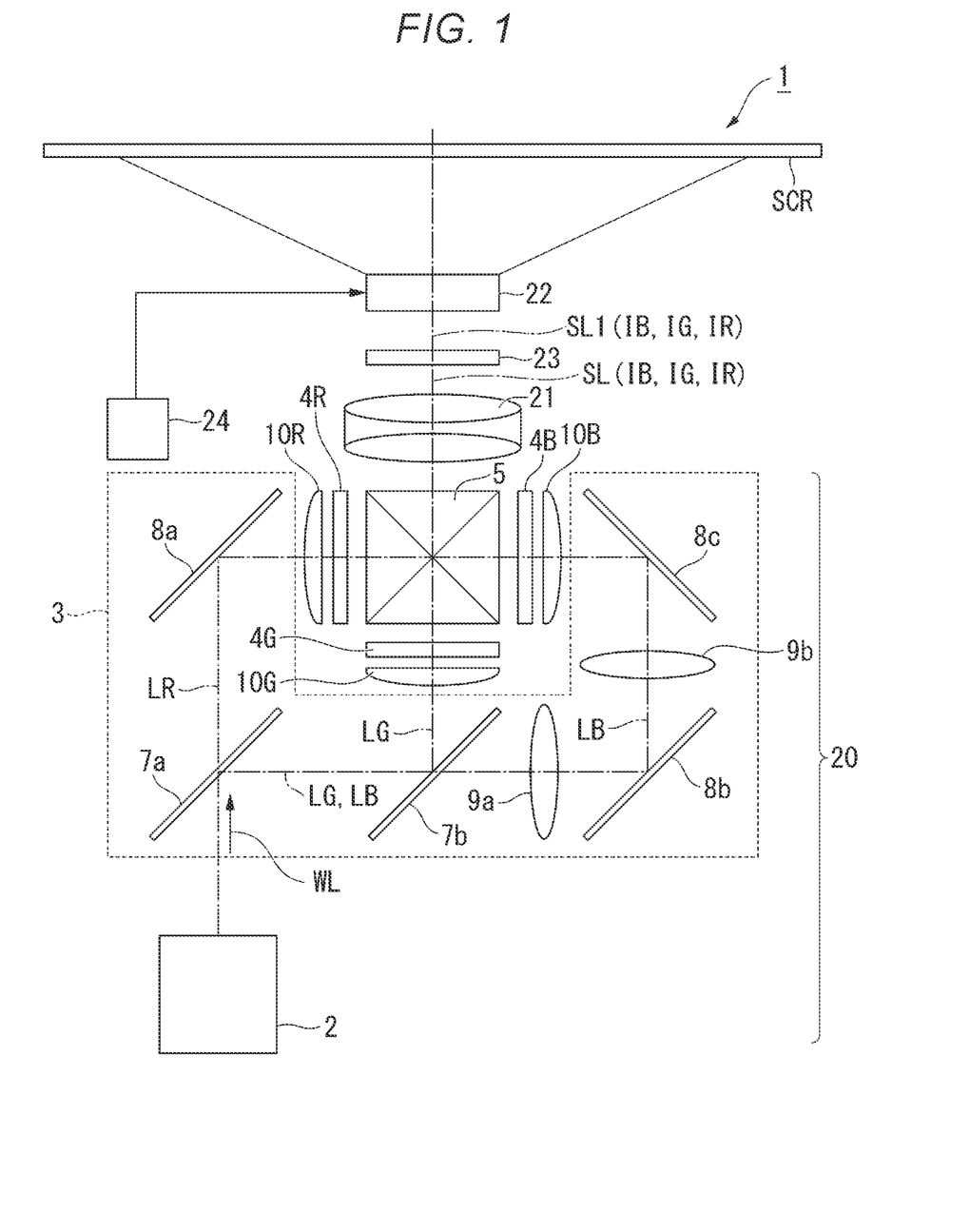
FIG. 1 is a diagram showing a schematic configuration of a projector according to a first embodiment.

FIG. 1 is a diagram showing a schematic configuration of the projector according to the present embodiment.

As shown in FIG. 1, a projector 1 according to the present embodiment is provided with an image light generator 20, a projection optical device 21, a polarization switching element 22, a retardation element 23, and a controller 24. The projector 1 is a projection-type image display device for displaying a color image on a screen SCR.

The image light generator 20 modulates the light from the light source device 2 to generate image light SL. The image light generator 20 includes a light source device 2, a color separation optical system 3, a light modulator 4R, a light modulator 4G, a light modulator 4B, and a combining prism 5.

As the light source device 2, there are provided, for example, a laser source and the wavelength conversion element although not shown in the drawings. The light source device 2 collects a blue laser beam emitted from file laser source with a light collection lens as excitation light to enter a wavelength conversion element including a phosphor, and then emits illumination light WL as white light consisting of the blue laser beam and yellow fluorescence. It should be noted that the light source device 2 is not limited to the configuration using the laser source and the wavelength conversion element, but there can be adopted, for example, a configuration using a laser source alone, or a configuration using an LED or a discharge type light source lamp.

The color separation optical system 3 separates the illumination light WL as the white light from the light source device 2 into red light LR, green light LG, and blue light LB. The color separation optical system 3 is provided with a first dichroic mirror 7a and a second dichroic mirror 7b, a first total reflection mirror 8a, a second total reflection mirror 8b, and a third total reflection mirror 8c, and a first relay lens 9a and a second relay lens 9b.

The first dichroic mirror 7a separates the illumination light WL from the light source device 2 into the red light LR and the rest of the light, namely the green light LG and the blue light LB. The first dichroic mirror 7a transmits the red light LR thus separated from, and at the same time, reflects the rest of the light. The second dichroic mirror 7b reflects the green light LG, and at the same time, transmits the blue light LB.

The first total reflection mirror 8a reflects the red light LR toward the light modulator 4R. The second total reflection mirror 8b and the third total reflection mirror 8c guide the blue light LB to the light modulator 4B. The green light LG is reflected by the second dichroic mirror 7b toward the light modulator 4G.

The first relay lens 9a is disposed in a posterior stage of the second dichroic mirror 7b in the light path of the blue light LB. The second relay lens 9b is disposed in a posterior stage of the second total reflection mirror 8b in the light path of the blue light LB.

The light modulator (a first light modulator) 4B modulates the blue light LB obtained by separating the illumination light WL emitted from the light source device in accordance with image information to form blue modulated light (first light) IB having a blue wavelength band. The light modulator (a second light modulator) 4G modulates the green light LG obtained by separating the illumination light WL emitted from the light source device 2 in accordance with the image information to form green modulated light (second light) IG having a green wavelength band. The light modulator (a third light modulator) 4R modulates the red light LB obtained by separating the illumination light WL emitted from the light source device in accordance with the image information to form red modulated light (third light) IR having a red wavelength band. In the present embodiment the blue wavelength band corresponds to, for example, 440 through 490 nm, the green wavelength band corresponds to, for example, 500 through 560 nm, and the red wavelength band corresponds to, for example, 610 through 750 nm.

In the present embodiment, as the light modulators 4R, 4G, and 4B, there are used, for example, transmissive liquid crystal panels. Further, at the light incident side and the light exit side of the liquid crystal panel, there are disposed polarization plates not shown, respectively, and thus, there is formed a configuration of transmitting only the linearly-polarized light with a specific direction.

At the incident side of the light modulator 4R, the light modulator 4G, and the light modulator 4B, there are disposed a field lens 10R, a field lens 10G, and a field lens 10B, respectively. The field lens 10R, the field lens 10G, and the field lens 10B collimate principal rays of the red light LR, the green light EG, and the blue light LB which enter the light modulator 4R, the light modulator 4G, and the light modulator 4B, respectively.

The combining prism 5 combines the light beams respectively emitted from the light modulators 4R, 4G, and 4B with each other to emit full-color image light toward the projection optical device 21. As the combining prism 5, there is used, for example, a cross dichroic prism.

The projection optical device 21 in the present embodiment is constituted by a plurality of lenses. The projection optical device 21 projects the image light SL having been combined by the combining prism 5 toward the screen SCR in an enlarged manner. It should be noted that the image light SL includes the blue modulated light IB, the green modulated light IG, and the red modulated light IP respectively emitted from the light modulators 4B, 4G, and 4R.

The polarization switching element 22 is disposed at the light exit side of the image light generator 20, namely the light exit side of the combining prism 5. In the present embodiment, the polarization switching element 22 is disposed at the light exit side of the projection optical device 21. The polarization switching element 22 switches the polarization state of the image light SL with a predetermined period as described later. In the present embodiment, the polarization switching element 22 is formed of, for example, a liquid crystal panel which is driven in a VA mode. The controller 24 controls the drive of the polarization switching element 22.

Here, the blue modulated light IB, the green modulated light IG, and the red modulated light IR are linearly-polarized light beams corresponding to transmission axes of the polarization plates not shown disposed at the light exit side of the respective light modulators 4B, 4G, and 4R. The polarization direction with respect to the separation film of the combining prism 5 is different between the blue modulated light IB and the red modulated light IR, and the green modulated light IG.

In the case of the present embodiment, the blue modulated light IB and the red modulated light IR are transverse waves with respect to the separation film of the combining prism 5, and the green modulated light IG is a longitudinal wave with respect to the separation film of the combining prism 5.

Therefore, the blue modulated light IB, the green modulated light IG, and the red modulated light IP forming the image light SL are not uniformed in polarization direction when emitted from the image light generator 20. Specifically, the Green modulated light IG is different in polarization direction as much as 90° from the blue modulated light IB and the red modulated light IR.

The projector 1 according to the present embodiment has the retardation element 23 disposed on the light path of the image light St emitted from the image light generator 20, and at the light incident side of the polarization switching element 22. In other words, the retardation element 23 is disposed on the light path between the combining prism 5 and the polarization switching element 22.

The retardation element 23 selectively changes the phase of the light in any one of the blue wavelength band, the green wavelength band, and the red wavelength band. In the case of the present embodiment, the retardation element 23 provides a phase difference of 180° to the light in the green wavelength band of the green modulated light IG, but does not provide a phase difference to the blue modulated light IB and the red modulated light IR in a wavelength band other than the green wavelength band. In such a manner, the retardation element 23 is formed of for example, a ½ wave plate having wavelength selectivity.

As described above, the retardation element 23 provides the phase difference of 180° only to the green modulated light IG out of the image light SL. Thus, by the polarization direction of the green modulated light IG being rotated as much as 90°, there occurs the state in which the green modulated light IG, the blue modulated light IB, and the red modulated light IR are uniformed in polarization direction. In such a manner, in the projector 1 according to the present embodiment, it is possible to uniform the polarization directions of the blue modulated light IB, the green modulated light IG, and the red modulated light IR forming the image light SL into one direction by the retardation element 23 disposed at the light incident side of the polarization switching element 22.

As described above, the blue modulated light IB, the green modulated light IG, and the red modulated light IR forming the image light SL enter the polarization switching element 22 in the state in which the polarization directions thereof are uniformed, namely as linearly-polarized light. Hereinafter, the image light St which is converted into the linearly-polarized light by the retardation element 23 and then enters the polarization switching element 22 is referred to as "image light SL1." In the present embodiment, it is assumed that the image light SL1 enters the polarization switching element 22 as the linearly-polarized light as the transverse wave with respect to a horizontal plane.

Figure 2:
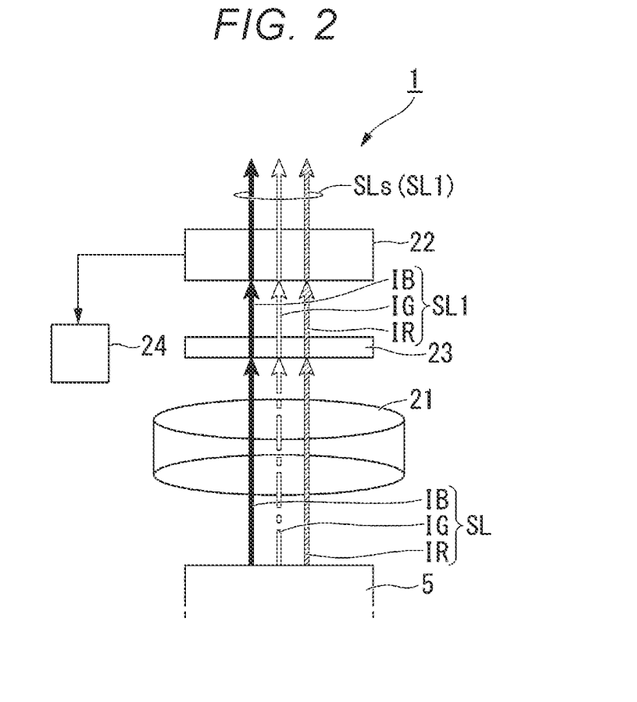
FIG. 2 is a diagram showing a first drive state of a polarization switching element.
Figure 3:
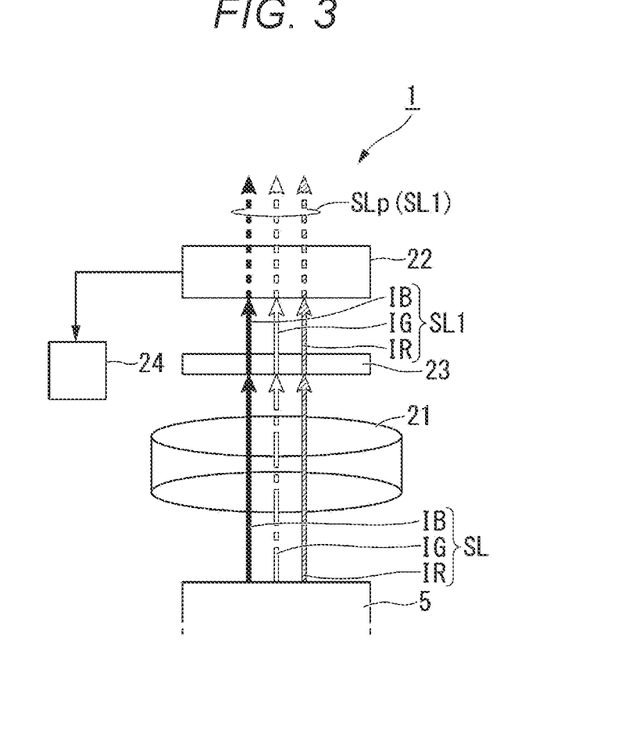
FIG. 3 is a diagram showing a second drive state of the polarization switching element.

FIG. 2 and FIG. 3 are diagrams for conceptually explaining a polarization switching operation by the polarization switching element 22.

FIG. 2 is a diagram showing a first drive state of the polarization switching element 22. FIG. 3 is a diagram showing a second drive state of the polarization switching element 22.

It should be noted that in order to simplify the description, it is assumed that no phase difference is provided to the image light SL1 when the polarization switching element 22 is set to the first drive state, and a phase difference of 180° is provided to the image light SL1 when the polarization switching element 22 is set to the second drive state.

As shown in FIG. 2, when the polarization switching element 22 is in the first drive state, no phase difference is provided to the image light SL1. Therefore, when the polarization switching element 22 is in the first drive state, the change rate of the polarization state (hereinafter simply referred to as a "polarization change rate") of the image light SL1 emitted from the polarization switching element 22 becomes 0%. Here, the polarization change rate of 0% means the fact that, for example, the light having entered the polarization switching element 22 as the transverse wave is emitted from the polarization switching element 22 as the transverse wave.

In other words, when the polarization switching element 22 is in the first drive state, the image light SL1 is emitted from the polarization switching element 22 as the transverse wave SLs.

In contrast, when the polarization switching element 22 is switched by the controller 24 to the second drive state, the phase difference of 180° is provided to the image light SL1 as shown in FIG. 3. Therefore, when the polarization switching element 22 is in the second drive state, the polarization change rate of the image light SL1 becomes 100%. Here, the polarization change rate of 100% means the fact that, for example, the light having entered. the polarization switching element 22 as the transverse wave is emitted from the polarization switching element 22 as the longitudinal wave with respect to the horizontal plane.

In other words, when the polarization switching element 22 is in the second drive state, the image light SL1 is emitted from the polarization switching element 22 as the longitudinal wave SLp.

It should be noted that the longitudinal ware SLp and the transverse wave SLs in the image light SL1 are in an opposite relationship to the polarization direction with respect to the separation film of the combining prism 5 perpendicular to the horizontal plane. In other words, the longitudinal wave SLp is a transverse wave with respect to the separation film of the combining prism 5, and the transverse wave SLs is a longitudinal wave with respect to the separation film of the combining prism 5.

In the present embodiment, the controller 24 controls the polarization switching element 22 so as to switch between the first drive state and the second drive state with a predetermined period. The controller 24 switches the drive state of the polarization switching element 22 with a frequency in a range of 1 through 20 Hz. Thus, is possible to set the polarization state of the image light SL1 emitted from the polarization switching element 22 to the state of being switched between the transverse wave SLs and the longitudinal wave SLp with a predetermined period.

Here, the transverse wave SLs and the longitudinal wave SLp in the image light SL1 emitted alternately with the predetermined period can visually be recognized as a normal image for a human which cannot visually recognize the polarization.

In contrast, it is known that insects can visually recognize the longitudinal wave and the transverse wave as light and dark. For example, when insects visually recognize the light of the transverse wave SLs as a dark part, and visually recognize the light of the longitudinal wave SLp as a light part, the insects visually recognize the transverse wave SLs or the longitudinal wave SLp in the image light SL1 emitted alternately with the predetermined period as a blink of light. Since the insects hate the blink of the light to avoid the blink, the image light SL1 emitted from the polarization switching element 22 can exert an insect repellent effect. As the insects having such a characteristic, there can be illustrated insects having a phototaxis such as a dipterous insect (a chironomid) or a lepidopteran (a moth).

Incidentally, in the explanation with reference to FIG. 2 and FIG. 3 described above, in order to simplify the story, it is assumed that the polarization change rate in the polarization switching element 22 is switched between 0% and 100% when switching the drive state in the polarization switching element 22.

However, the liquid crystal panel in the VA mode constituting the polarization switching element 22 has a characteristic of causing a difference in polarization change rate in accordance with the wavelength band of the incident light in some cases as described later.

Hereinafter, a method of further enhancing the insect repellent effect described above when the polarization switching element 22 has the characteristic of making the polarization change rate different in accordance with the wavelength band of the incident light will specifically be described.

Figure 4:
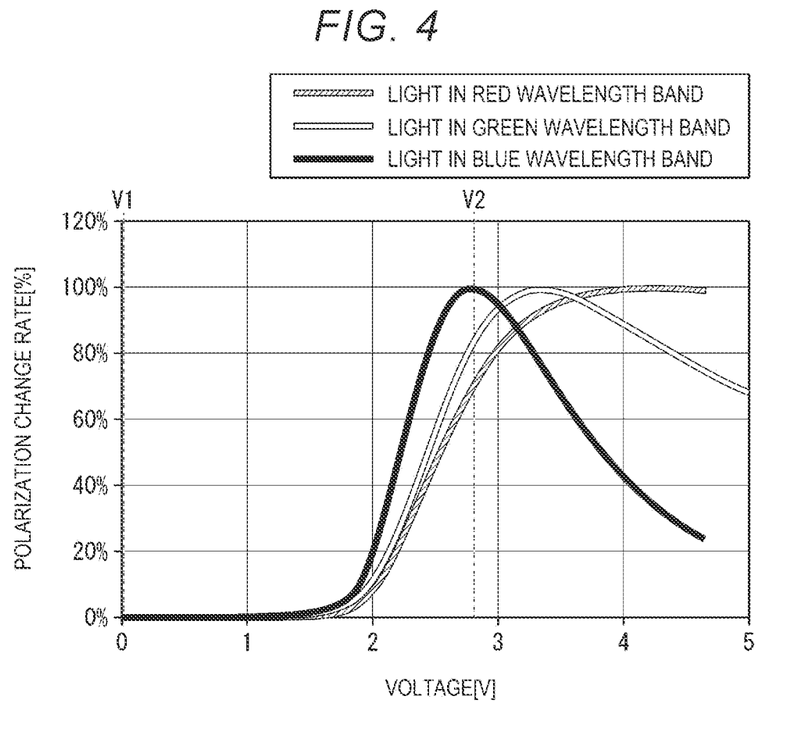
FIG. 4 is a graph showing a relationship between a voltage and a polarization change rate in the polarization switching element.

FIG. 4 is a graph showing a relationship between the voltage and the polarization change rate in the liquid crystal panel in the VA mode constituting the polarization switching element 22. In FIG. 4, the horizontal axis represents the voltage (unit: V) to be applied to the liquid crystal panel, and the vertical axis represents the polarization change rate (unit: %) of the light to be emitted from the liquid crystal panel when applying the voltage. Further, in FIG. 4, the relationship between the voltage and the polarization change rate is shown for each of the light in the blue wavelength band, the light in the green wavelength band, and the light in the red wavelength band.

It should be noted that the relationship between the voltage and the polarization change rate shown in FIG. 4 is equivalent to the relationship between the voltage and the transmittance when disposing the polarization plates at the light incident side and the light exit side of the liquid crystal panel in the VA mode constituting the polarization switching element 22 a cross-Nicol arrangement. For example, the polarization change rate of 100% corresponds to the transmittance of 100% when using the polarization switching element 22 as the transmissive panel, and the polarization change rate of 0% corresponds to the transmittance of 0%.

As described above, the controller 24 in the present embodiment controls the polarization switching element 22 so as to switch between the first drive state and the second drive state. In the first drive state, the controller 24 controls the polarization switching element 22 to apply a first voltage V1, and in the second drive state, the controller 24 controls the polarization switching element 22 to apply a second voltage V2. As shown in FIG. 4, for example, the first voltage V1 is set to 0 V, and the second voltage V2 is set to 2.8 V.

In the case of the first drive state of applying the first voltage V1, since the polarization switching element 22 does not provide the phase difference to the incident light, the polarization change rate of the polarization switching element 22 becomes 0%. On this occasion, as shown in FIG. 2, the image light SL1 is emitted from the polarization switching element 22 as the transverse wave SLs.

Here, in the first drive state of applying the first voltage V1, the polarization change rate of the polarization switching element 22 becomes 0% irrespective of the wavelength band of the incident light. Therefore, when the first voltage V1 is applied, there is no chance that a difference by the wavelength band occurs in the phase difference of the image light SL1 transmitted through the polarization switching element 22. Therefore, the image light SL1 as the transverse wave SLs is visually recognized by the insects as a dark part having no difference in luminance by the wavelength band.

In contrast, as shown in FIG. 4, when the applied voltage rises to a level higher than 2 V, the polarization switching element 22 becomes in the state in which the polarization change rate differs in accordance with the wavelength band of the incident light. When setting the second voltage V2 to 2.8 V, the polarization change rate with respect to the light in the blue wavelength band becomes 100%, the polarization change rate with respect to the light in the green wavelength band becomes about 80% lower than 100%, and the polarization change rate with respect to the light in the red wavelength band becomes a value approximate to 70% much lower.

As described above, since the image light SL1 is the light including the blue modulated light IB, the green modulated light IG, and the red modulated light IR, the polarization change rate of the polarization switching element 22 in the second drive state with respect to the blue component (the blue modulated light IB) included in the image light S11 becomes 100%.

In other words, the blue component (the blue modulated light IB) included in the image light SL1 is provided with the phase difference of 180° by being transmitted through the polarization switching element 22 in the second drive state. Therefore, the blue component (the blue modulated light IB) included in the image light SL1 is emitted as the longitudinal wave from the polarization switching element 22.

In contrast, the polarization change rate of the Polarization switching element 22 in the second drive state with respect to the green component (the green modulated light IG) and the red component (the red modulated light IR) out of the image light SL1 becomes lower than 100%.

Therefore, the phase difference provided to the green component (the green modulated light IG) and the red component (the red modulated light IR) included in the image light SL1 when being transmitted through the polarization switching element 22 in the second drive state becomes smaller than 180°. Thus, the green component (the green modulated light IG) and the red component (the red modulated light IR) included in the image light SL1 are emitted from the polarization switching element 22 as elliptically-polarized light instead of the longitudinal wave.

Here, the green component (the green modulated light IG) and the red component (the red modulated light IR) having been converted from the transverse wave into the elliptically-polarized light becomes lower in change rate of the polarization state compared to the blue component (the blue modulated light IB) having been converted from the transverse wave into the longitudinal wave, and therefore has a possibility of degrading the contrast ratio caused by the blink of the light by the image light SL1 visually recognized by the insects.

Incidentally, it is known that in general, insects have a characteristic that the luminosity factor with respect to light of a blue component is higher compared to the luminosity factor with respect to light of a green component or a red component. The inventors have focused attention on a difference in the luminosity factor of insects with respect to colored light. In the case of the present embodiment, it is arranged that the polarization switching element 22 is controlled by the controller 24 so that the polarization change rate with respect to the blue modulated light IB becomes higher than the polarization change rate with respect to the green modulated light IG and the red modulated light IR.

Specifically, in the present embodiment, the second voltage V2 to be applied in the second drive state is set to 2.8 V to thereby make the polarization change rate with respect to the blue modulated light IB higher than the polarization change rate with respect to the green modulated light IG and the red modulated light IR. Thus, it is possible to convert the polarization state of the blue component, which is the highest in luminosity factor of insects, from the transverse wave into the longitudinal wave by setting the polarization change rate of the blue component to 100% in priority. Therefore, it is possible to make the change rate of the polarization state of the blue component the highest when switching the drive state of the polarization switching element 22.

Therefore, since it becomes relatively difficult for insects to recognize the blink of the light by the green component and the red component, it is possible for the insects to mainly recognize the blink of the light caused by the blue component the highest in luminosity factor.

Therefore, according to the present embodiment, even when the liquid crystal panel having a characteristic in which the polarization change rate differs by the wavelength band of the incident light is used as the polarization switching element 22, it is possible to sufficiently increase the repellent effect by making the insects visually recognize the image light SL1 as intense blinks of light.

Advantages of the present embodiment will hereinafter be described.

The projector 1 according to the present embodiment is provided with the image light generator 20 for modulating the light emitted from the light source device 2 to generate the image light SL1, the projection optical device 21 for projecting the image light SL1, the polarization switching element 22 which is disposed at the light exit side of the image light generator 20, and switches the polarization state of the image light SL1 emitted from the image light generator 20, and the controller 24 for controlling the polarization switching element 22, wherein the controller 24 controls the polarization switching element 22 switch the polarization state of the image light SL1 with a predetermined period.

According to the present embodiment, by emitting the image light SL1 while switching the polarization state thereof between the transverse wave SLs and the longitudinal wave SLp with a predetermined period, it is possible to make the insects visually recognize the image light SL1 as the blinks of light. Since the insects having the phototaxis hate the blink of the light to avoid the blink, the image light SL1 emitted from the polarization switching element can exert an insect repellent effect. Therefor according to the present embodiment, it is possible to reduce the occurrence of a trouble due to the insects when using the projector 1 outdoors.

In the present embodiment, the image light generator 20 includes the light modulator 4B for modulating the light from the light source device 2 in accordance with the image information to generate the blue modulated light IB, the light modulator 45 for modulating the light from the light source device 2 in accordance with the image information to generate the green modulated light IG, the light modulator 4R for modulating the light from the light source device 2 in accordance with the image information to generate the red modulated light IR, and the combining prism for combining the blue modulated light IB, the green modulated light IG, and the red modulated light IR to each other to generate the image light SL1.

According, to this configuration, it is possible to modulate the illumination light WL from the light source device 2 to generate the image light SL1 as full-color image light.

In the present embodiment, there is provided the retardation element 23 which is disposed on the light path between the combining prism 5 and the polarization switching element 22, and selectively changes the phase of the light in any one of the blue wavelength band, the green wavelength band, and the red wavelength band.

According to this configuration, it is possible to convert the image light SL1 into linearly-polarized light to enter the polarization switching element 22.

In the present embodiment, the polarization switching element 22 has a characteristic in which the polarization change rate in the image light SL1 differs in accordance with the wavelength band of the incident light, and the controller 24 controls the polarization switching element 22 so that the polarization change rate with respect to the blue modulated light IB becomes higher than the polarization change rate with respect to the green modulated light IG and the red modulated light IR.

According to this configuration, the degree of change of the polarization state of the blue component the highest in luminosity factor of the insects can be made the highest. Thus, since the insects recognize the blinks of the blue light the highest in luminosity factor even when the contrast ratio of the blinks of the light by the green component and the red component is relatively low, it is possible to obtain the high repellent effect even when using the liquid crystal panel having the characteristic in which the polarization change rate differs in accordance with the wavelength band of the incident light.

In the present embodiment, the frequency with which the controller 24 switches the polarization state of the image light SL1 is in a range of 1 through 20 Hz.

According to this configuration, by making the insects efficiently recognize the blinks of the light, it is possible to effectively obtain the insect repellent effect.

An the present embodiment, the polarization switching element 22 is formed of a liquid crystal panel.

In this case, it is possible to easily and surely switch the polarization state of the image light SL1 to thereby obtain the insect repellent effect.

In the present embodiment, the polarization switching element 22 is disposed at the light, exit side of the protection optical device 21.

According to this configuration, the polarization switching element 22 is attached at the light exit side of the projection optical device 21, namely outside the projection optical device 21 as a result. In this case, the projector according to the present disclosure can be realized by attaching the polarization switching element outside the projection optical device of existing projector equipment. Therefore, since it becomes possible to realize the configuration of the projector according to the present disclosure without significantly changing the configuration of the existing projector equipment, it is possible to reduce the cost of the projector 1 according to the present embodiment as a result.

Further, according to the projector 1 related to the present embodiment, since it becomes difficult for the insects to converge around the projector 1, it is possible to reduce the failure risk due to the invasion by the insects into the projector, and at the same time, it is possible to prevent the cooling performance from degrading due to the fact that the clogging of the filter disposed in a suction opening of a cooling mechanism is incurred. Therefore, it is possible to reduce the risk of exerting a harmful influence on the display quality and the reliability. Further, it is possible to reduce the maintenance cost such as prevention of the degradation of the display quality and filter replacement.

Further, according to the projector 1 related to the present embodiment, since it becomes difficult for the insects to converge around the projector 1, it is possible to reduce the degradation of the display quality due to the insects adhering to the projection optical device 21.

Further, according to the projector 1 related to the present embodiment, since it becomes difficult for the insects to converge on the projection image, it becomes difficult to provide visually uncomfortable feeling, and thus, it is possible to reduce the risk of damaging the original purpose of the projector such as a purpose of providing visual for audience or passerby with projection mapping or signage.

Further, insects become a factor for causing a loss of health such as allergy in some cases. In contrast, according to the projector related to the present embodiment, since it becomes difficult for the insects to converge on the projection image, the health risk of the user including an operator and an appreciator is reduced, and thus, it is possible to provide a safer and mere comfortable visual communication environment.

Second Embodiment

An example of a projector according to a second embodiment will be described. It should be noted that members common to the embodiment described above will be denoted by the same reference symbols, and the detailed description thereof will be omitted.

Figure 5:
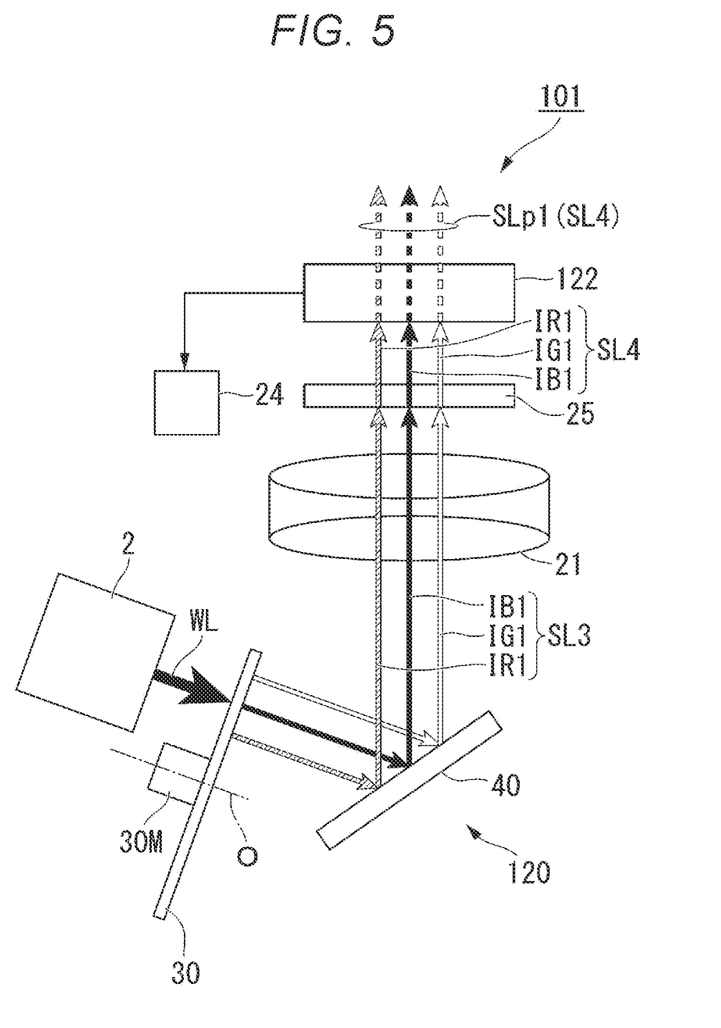
FIG. 5 is a diagram showing a schematic configuration of a projector according to a second embodiment.

FIG. 5 is a diagram showing a schematic configuration of the projector according to the present embodiment.

As shown in FIG. 5, the projector 101 according to the present embodiment is provided with an image light generator 120, the projection optical device 21, a polarization switching element 122, a polarization plate 25, and the controller 24.

The image light generator 120 in the present embodiment has the light source device 2, a color wheel 30, and a light modulator 40.

The illumination light WL as white light having been emitted from the light source device 2 enters the color wheel 30. The color wheel 30 is formed to have a disk-like shape, and a rotary shaft O is disposed at the center of the disk. A drive device 30M such as an electric motor is coupled to the rotary shaft O of the color wheel 30, and the color wheel 30 rotationally driven in the circumferential direction by the drive device 30M. The color wheel 30 is provided with color filters such as thin film interference filters for transmitting respective colored light beams of red, green, and blue disposed along the circumferential direction. The colored light beams of red, green, and blue are emitted from the color wheel 30 in a time-sharing manner.

The colored light beams of red, green, and blue emitted from the color wheel 30 in a time-sharing manner enter the light modulator 40. The light modulator 40 in the present embodiment is a micromirror type light modulator, and there is used, for example, a DMD (Digital Micromirror Device). The DMD has a configuration having a plurality of micromirrors arranged in a matrix. The DMD switches the tilt directions of the plurality of micromirrors to thereby switch the reflection direction of the incident light at high speed between the direction in which the incident light enters the projection optical device 21 and the direction in which the incident light fails to enter the projection optical device 21. As described above, the image light generator 120 in the present embodiment sequentially modulates the illumination light WI emitted from the light source device 2 to emit blue modulated light IB1, green modulated light IG1, and red modulated light IR1 in a time-sharing manner to thereby generate image light STA. Hereinafter, the blue modulated light IB1, the green modulated light IG1, and the red modulated light IR1 are collectively referred to simply as "modulated light beams IB1, IG1, and IR1" in some cases.

The polarization plate 25 is disposed on the light path between the light source device 2 of the image light generator 120 and the polarization switching element 122. In the case of the present embodiment, the polarization plate 25 is disposed at the light exit side of the projection optical device 21.

In the present embodiment, the modulated light beams IB1, IG1, and IR1 forming the image light SL3 emitted from the image light generator 120 are each unpolarized light. Each of the modulated light beams IB1, IG1, and IR1 is transmitted through the polarization plate 25 to thereby be converted into a transverse wave (lineary-polarized light) with respect to the horizontal plane. Each of the modulated light beams IB1, IG1, and IR1 having been transmitted through the polarization plate 25 enters the polarization switching element 122. The light formed of the modulated light beams IB1, IG1, and IR1 transmitted through the polarization plate 25 and then emitted in a time-sharing manner is hereinafter referred to as "image light SL4." The image light SL4 enters the polarization switching element 122 as the linearly-polarized light.

The polarization switching element 122 is disposed at the light exit side of the image light generator 120. In the present embodiment, the polarization switching element 122 is disposed at the light exit side of the projection optical device 21.

The polarization switching element 122 switches the polarization state of the image light SL4 with a predetermined period. In the present embodiment, the polarization switching element 122 is formed of, for example, a liquid crystal panel which is driven in a TN mode. The controller 24 drives the polarization switching element 122 so as to switch between the first drive state and the second drive state.

First, in order to simplify the description, it is assumed that a phase difference of 180° is provided to the image light SL4 when the polarization switching element 122 is set to the first drive state, and no phase difference is provided to the image light SL4 when the polarization switching element 122 is set to the second drive state.

As shown in FIG. 5, when the polarization switching element 122 in the first drive state, the phase difference of 180° is provided to the image light SL4. Therefore, when the polarization switching element 122 is in the first drive state, the image light SL4 is emitted from the polarization switching element 122 as a longitudinal wave SLp1 with respect to the horizontal plane.

Figure 6:
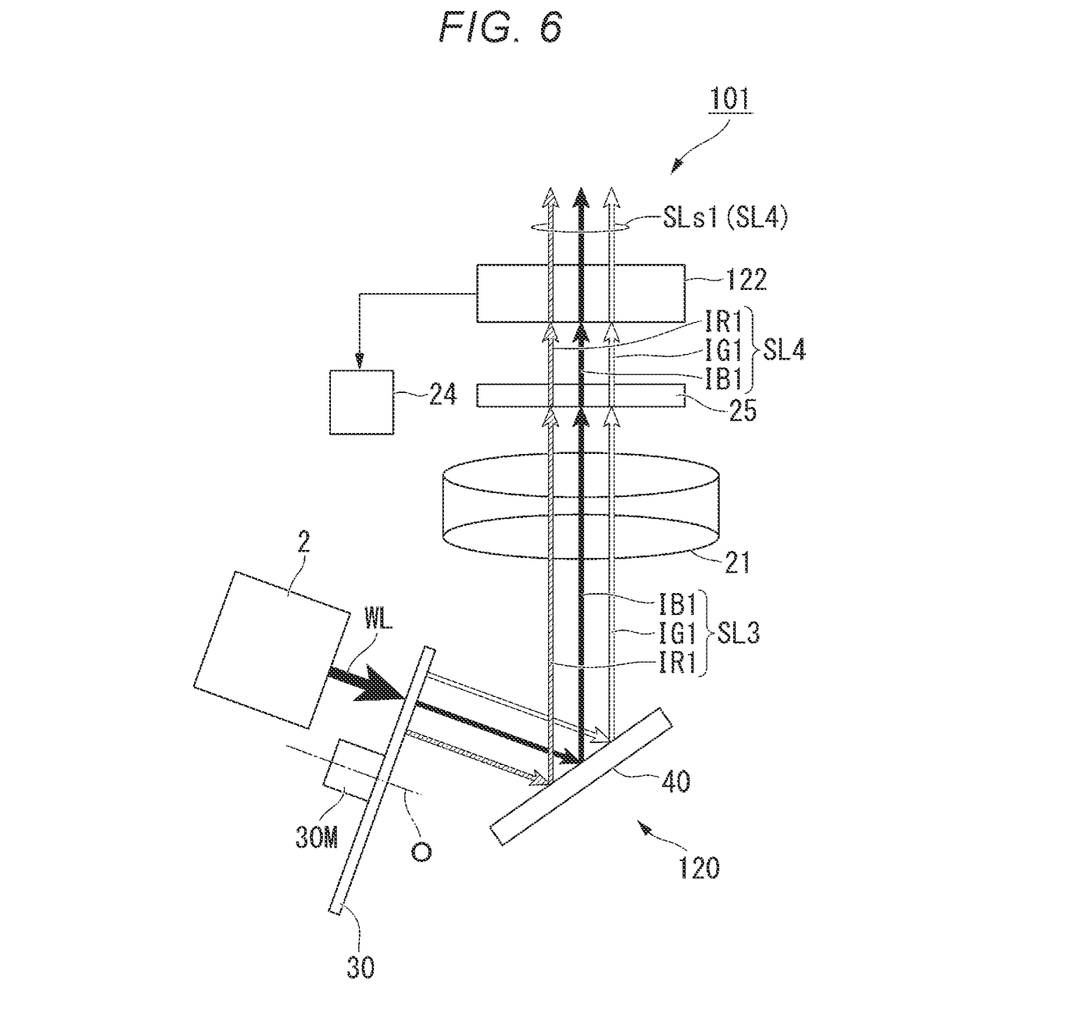
FIG. 6 is a diagram showing a second drive state of the polarization switching element.

FIG. 6 is a diagram showing the second drive state of the polarization switching element 122.

In contrast, when the polarization switching element 122 is switched by the controller 24 to the second drive state, no phase difference is provided to the image light SL4 as shown in FIG. 6. Therefore, when the polarization switching element 122 is in the second drive state, the image light SL4 is emitted from the polarization switching element 122 as a transverse wave SLs1 with respect to the horizontal plane.

In the present embodiment, the controller 24 switches the drive state of the polarization switching element 122 with a frequency in a range of 1 through 20 Hz. Thus, it is possible to switch the polarization state of each of the colored light beams forming the image light STA emitted from the polarization switching element 122 in a time-sharing manner between the longitudinal wave SLp1 and the transverse wave Sts1 with a predetermined period.

Thus, by making the insects visually recognize the image light SL4 different in polarization state emitted alternately with the predetermined period as the blinks of the light, it is possible to obtain the insect repellent effect.

In the explanation with reference to FIG. 5 and FIG. 6 described above, in order to simplify the story, it is assumed that the polarization change rate in the polarization switching element 122 is switched between 0% and 100% when switching the drive state in the polarization. switching element 122. However, the liquid crystal panel in the TN mode constituting the polarization switching element 122 in the present embodiment has a characteristic in which the polarization change rate differs in accordance with the wavelength band of the incident light in some cases as described later.

Hereinafter, a method of further enhancing the insect repellent effect described above when the polarization switching element 122 differs in polarization change rate in accordance with the wavelength band of the incident light will be described.

Figure 7A:
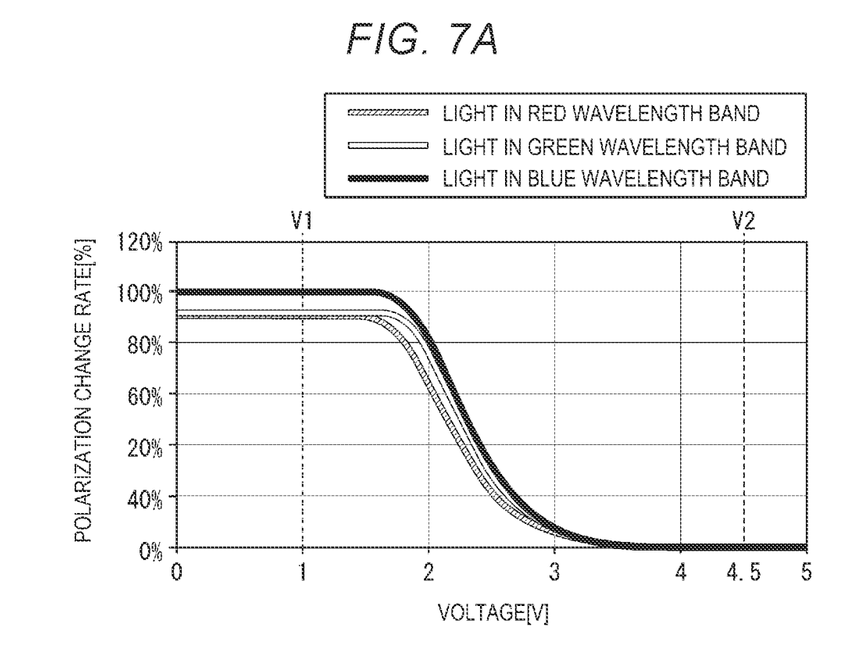
FIG. 7A is a graph showing a relationship between a voltage and a polarization change rate in the polarization switching element.
Figure 7B:
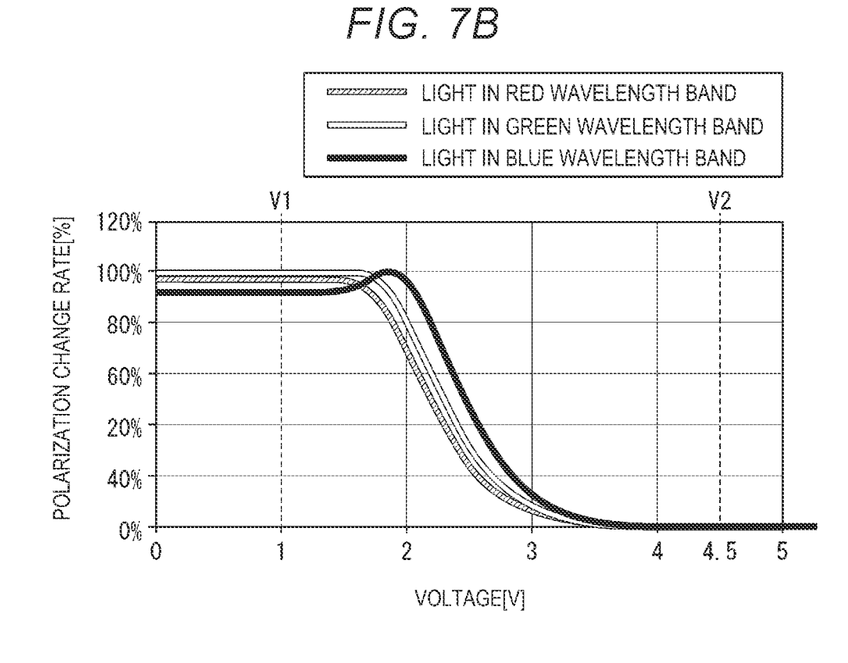
FIG. 7B is a graph showing a relationship between a voltage and a polarization change rate in a comparative example.

FIG. 7A is a graph showing a relationship between the voltage and the polarization change rate in the liquid crystal panel in the TN mode constituting the polarization switching element 122. FIG. 7B is a graph showing a relationship between the voltage and the polarization change rate in another liquid crystal panel in the TN mode as a comparative example.

In FIG. 7A and FIG. 7B, the horizontal axis represents the voltage (unit: V) to be applied to the liquid crystal panel, and the vertical axis represents the polarization change rate (unit: %) of the light to be emitted from the liquid crystal panel when applying the voltage. Further, in FIG. 7A and FIG. 7B, the relationship between the voltage and the polarization change rate is shown for each of the light in the blue wavelength band, the light in the Green wavelength band, and the light in the red wavelength band.

In the present embodiment, the controller 24 controls the polarization switching element 122 to apply 1.0 V as the first voltage V1 in the first drive state, and apply 4.5 V as the second voltage V2 in the second drive state as shown in FIG. 7A.

In the case of the present embodiment, in the case of the second drive state of applying the second voltage V2, since the polarization switching element 122 does not provide the phase difference to the incident light, the polarization change rate of the polarization switching element 122 becomes 0%. On this occasion, the image light SL4 is emitted from the polarization switching element 122 as the transverse wave SLs1.

Here, in the second drive state of applying the second voltage V2, the polarization change rate of the polarization switching element 122 becomes 0% irrespective of the wavelength band of the incident light. Therefore, when the second voltage V2 is applied, there is no chance that a difference by the wavelength band occurs in the phase difference of the image light SL4 transmitted through the polarization switching element 122. Therefore, the image light SL4 as the transverse wave SLs1 is visually recognized by the insects as a dark part having no difference in luminance by the wavelength band.

In contrast, as shown in FIG. 7A, in the case of the first drive state in which the first voltage V1 lower than the second voltage V2 is applied, the polarization switching element 122 becomes to differ in polarization change rate in accordance with the wavelength band of the incident light. When setting the first voltage V1 to 1.0 V, the polarization change rate with respect to the light in the blue wavelength band becomes approximately 100%, the polarization change rate with respect to the light in the green wavelength band becomes lower than 100%, and the polarization change rate with respect to the light in the red wavelength band becomes much lower. In other words, in the polarization switching element 122, the polarization change rate with respect to the light in the green wavelength band or the red wavelength band fails to become 100%.

In the present embodiment, in the polarization switching element 122 in the first drive state, the polarization change rate with respect to the light in the blue wavelength band (the blue modulated light IB1) as a part of the image light S14 becomes approximately 100%. In other words, the light in the blue wavelength band (the blue modulated light IB1) of the image light SL4 is provided with the phase difference of 180° when being transmitted. through the polarization switching element 122. Therefore, the light in the blue wavelength band out of the image light 8L4 is emitted from the polarization switching element 122 as the longitudinal wave.

In contrast, the polarization change rate of the polarization switching element 122 in the first drive state with respect to the light in the green wavelength band (the green modulated light IG1) and the light in the red wavelength band (the red modulated light IR1) out of the image light SL4 becomes lower than 100%. Therefore, the phase difference to be provided to the light in the green wavelength band (the green modulated light IG1) and the light in the red wavelength band (the red modulated light IR1) becomes smaller than 180%. Therefore, the green component (the green modulated light IG1) and the red component (the red modulated light IR1) are emitted from the polarization switching element 122 as elliptically-polarized light.

As described above, in the insects, the luminosity factor with respect to the light in the blue wavelength band is higher compared to the light in the green wavelength band or the red wavelength band. The inventors focused attention on the difference in luminosity factor of the insects by the color of the light, and used the liquid crystal panel the sell thickness or the refractive index difference Δn of which is selected so that the polarization change rate with respect to the light in the blue wavelength band becomes higher than the polarization change rate with respect to the light in the green wavelength band or the red wavelength band as the polarization switching element 122 in the present embodiment.

In the liquid crystal panel in the comparative example shown in FIG. 7B, since the polarization change rate with respect to the light in the green wavelength band is made the highest, the insect repellent effect is lower compared to the liquid crystal panel used for the polarization switching element 122 according to the present embodiment. It should be noted that in the liquid crystal panel in the comparative example shown in FIG. 7B, for example, a protruding part in which the polarization change rate of the blue component becomes the highest occurs in the vicinity of the applied voltage of 1.8 V due to the Morgan condition. Therefore, it is conceivable to use the vicinity of the applied voltage of 1.8 V as the first drive state. However, in this case, since the difference between the polarization change rate in the light in the green wavelength band and the polarization change rate in the light in the red wavelength band increases, it becomes difficult to obtain the sufficient insect repellent effect.

In contrast, in the panel characteristic in the polarization switching element 122 in the present embodiment shown in FIG. 7A, the polarization change rate with respect to the light in the blue wavelength band is the highest and The difference in polarization change rate between the green wavelength band and the red wavelength band is small as described above, and therefore, it can be said that the liquid crystal panel in the polarization switching element 122 in the present embodiment is more preferable as the liquid crystal panel for obtaining the insect repellent effect.

As described hereinabove, according to the projector 101 related to the present embodiment, since the polarization switching element 122 formed of the liquid crystal panel having the characteristic described above is provided, by effectively increasing the contrast ratio when performing the blinks of the image light visually recognized by the insects, it is possible to further enhance the insect repellent effect.

Although the present disclosure is hereinabove described based on the embodiments described above, the present disclosure is not limited to the embodiments described above, but can be implemented in a variety of aspects within the scope or the spirit of the present disclosure.

Figure 8:
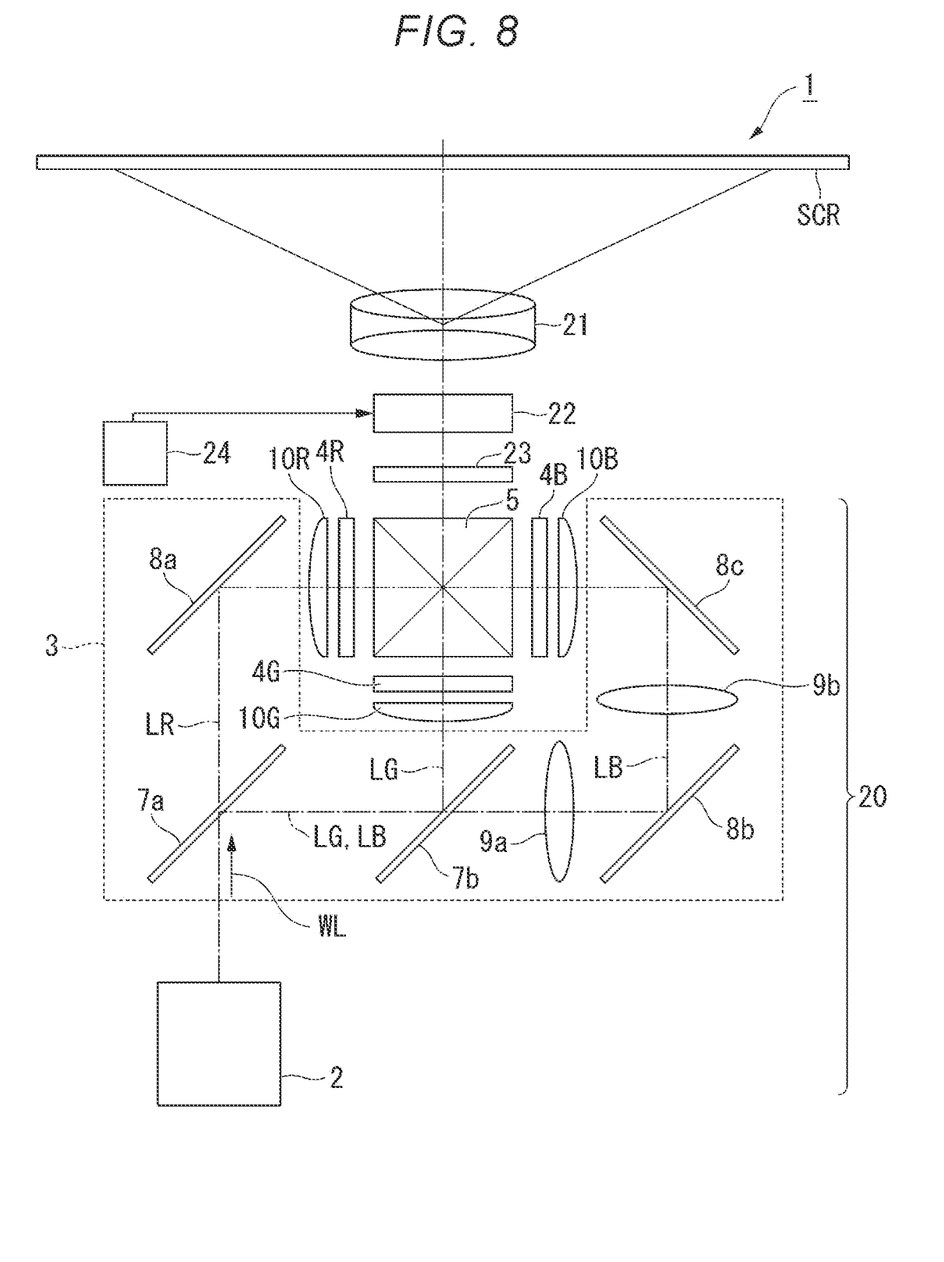
FIG. 8 is a diagram showing a schematic configuration of a projector according to a modified example.

For example, in the present embodiments, the polarization switching element 22, 122 is disposed in the posterior stage of the projection optical deice 21, but the present disclosure is not limited to this configuration. For example, it is possible to dispose the polarization switching element 22 and the retardation element 23 in the anterior stage (at the light incident side) of the projection optical device 21 in the configuration of the projector 1 according to the first embodiment as shown in FIG. 8. Similarly, it is possible to dispose the polarization switching element 122 and the polarization plate 25 in the anterior stage (at the light incident side) of the projection optical device 21 in the configuration of. The projector 101 in the second embodiment.

Further, in the embodiments described above, there are cited the cases of the VA mode and the TN mode as the examples of the drive mode of the liquid crystal panel constituting the polarization switching elements 22, 122, but it is possible to use, for example, an OCB mode when a high-speed response is required.

Further, in the embodiments described above, the values of the first voltage V1 and the second voltage V2 to be applied to the polarization switching elements 22, 122 are not particularly limited, but can arbitrarily be changed to optimum values in accordance with the characteristic of the liquid crystal panel to be used in the polarization switching element.

Further, in the embodiments described above, there is cited the case of performing the control with the two voltage values for switching the polarization state of the image light between the longitudinal wave and the transverse wave as an example, but it is possible to adopt an aspect of, for example, switching the polarization state of the image light with three or more voltage values including the circularly-polarized light.

Further, in the embodiments described above, there is cited the case of generating the full-color image light using the illumination light WL from the light source device as the image light generator 20, 120 as an example, but it is possible to use an image light generator of generating monochromatic image light of any one of the blue color, the green color, and the red color.

Further, in the second embodiment, there is cited the case of converting the polarization state of the image light SL4 into the transverse wave with respect to the horizontal plane using the polarization plate 25, but it is possible to convert the polarization state of the image light SL4 into the longitudinal wave with respect to the horizontal plane to enter the polarization switching element 122.

A projector according to an aspect of the present disclosure may have the following configuration.

The projector according to an aspect of the present disclosure includes an image light generator configured to modulate light emitted from a light source device to generate image light, a projection optical device configured to project the image light, a polarization. switching element which is disposed at a light exit side of the image light generator, and is configured to switch a polarization state of the image light emitted from the image light generator, and a controller configured to control the polarization switching element, wherein the controller controls the polarization switching element to switch the polarization state of the image light with a predetermined period.

In the projector according to the above aspect of the present disclosure, there may be adopted a configuration in which the image light generator includes a first light modulator configured to modulate the light from the light source device in accordance with image information to generate first light having a blue wavelength band, a second light modulator configured to modulate the light from the light source device in accordance with image information to generate second light having a green wavelength band, a third light modulator configured to modulate the light from the light source device in accordance with image information to generate third light having a red wavelength band, and a combining prism configured to combine the first light, the second light, and the third light to each other to generate the image light.

In the projector according to the above aspect of the present disclosure, there may be adopted a configuration further including a retardation element which is disposed on a light path between the combining prism and the polarization switching element, and is configured to selectively change a phase of light in any one of the blue wavelength band, the green wavelength band, and the red wavelength band.

In the projector according to the above aspect of the present disclosure, there may be adopted a configuration in which the polarization switching element has a characteristic in which a polarization change rate in the image light is different in accordance with a wavelength band of incident light, and the controller controls the polarization switching element to make the polarization change rate with respect to the first light higher than the polarization change rate with respect to the second light and the third light.

In the projector according to the above aspect of the present disclosure, there may be adopted a configuration in which the image light generator modulates the light from the light source device in accordance with image information, and emits first light having a blue wavelength band, second light having a green wavelength band, and third light having a red wavelength band in a time-sharing manner to generate the image light.

In the projector according to the above aspect of the present disclosure, there may be adopted a configuration further including a polarization plate disposed on a light path between the light source device of the image light generator and the polarization switching element.

In the projector according to the above aspect of the present disclosure, there may be adopted a configuration in which a frequency with which the controller switches the polarization state of the image light is in a range of through 20 Hz.

In the projector according to the above aspect of the present disclosure, there may be adopted a configuration in which the polarization switching element is formed of a liquid crystal panel.

In the projector according to the above aspect of the present disclosure, there may be adopted a configuration in which the polarization switching element is disposed at a light exit side of the projection optical device.

What is claimed is:

1. A projector comprising:
    an image light generator configured to modulate light emitted from a light source to generate image light;
    a projection optical device configured to project the image light;
    a polarization switching element disposed at a light exit side of the image light generator, the polarization switching element being configured to switch a polarization state of the image light emitted from the image light generator; and
    a controller configured to control the polarization switching element, wherein
    the image light includes first light having a blue wavelength band and second light having a green wavelength band and third light having a red wavelength band,
    the controller controls the polarization switching element to change the polarization change rate of the polarization switching element with a predetermined period,
    the polarization switching element has a characteristic in which the polarization change rate in the image light is different in accordance with a wavelength band of incident light, and
    a first polarization change rate with respect to the first light is higher than a second polarization change rate with respect to the second light and a third polarization change rate with respect to the third light.

2. The projector according to claim 1, wherein the image light generator includes;
    a first light modulator configured to modulate the light from the light source in accordance with image information to generate the first light,
    a second light modulator configured to modulate the light from the light source in accordance with image information to generate the second light,
    a third light modulator configured to modulate the light from the light source in accordance with image information to generate the third light, and
    a combining prism configured to combine the first light, the second light, and the third light to each other to generate the image light.

3. The projector according to claim 2, further comprising a retarder disposed on a light path between the combining prism and the polarization switching element, the retarder being configured to selectively change a phase of light having one of the blue wavelength band, the green wavelength band, and the red wavelength band.

4. The projector according to claim 1, wherein
the image light generator modulates the light from the light source in accordance with image information, and emits first light having a blue wavelength band, second light having a green wavelength band, and third light having a red wavelength band in a time-sharing manner to generate the image light.

5. The projector according to claim 3, further comprising a polarization plate disposed on a light path between the light source of the image light generator and the polarization switching element.

6. The projector according to claim 1, wherein
a switching frequency of the polarization state of the image light is no lower than 1 Hz and no higher than 20 Hz.

7. The projector according to claim 1, wherein
the polarization switching element is a liquid crystal panel.

8. The projector according to claim 1, wherein
the polarization switching element is disposed at the light exit side of the projection optical device.

9. A projector comprising:
an image light generator configured to modulate light emitted from a light source to generate image light;
a projection optical device configured to project the image light;
a polarization switching element disposed at a light exit side of the image light generator, the polarization switching element being configured to switch a polarization state of the image light emitted from the image light generator; and
a controller configured to control the polarization switching element, wherein
the controller controls the polarization switching element to switch the polarization state of the image light with a predetermined period, and
a switching frequency of the polarization state of the image light is no lower than 1 Hz and no higher than 20 Hz.

* * * * *